(12) United States Patent
Shen

(10) Patent No.: US 6,786,137 B1
(45) Date of Patent: Sep. 7, 2004

(54) CONTAINER FOR MAKING TEA

(76) Inventor: Tzu-Yuan Shen, No. 15, Hsi An Lane, Pu-Li Chen, Nan-Tou Hsien (TW)

( * ) Notice: Subject to any disclaimer, the term of this patent is extended or adjusted under 35 U.S.C. 154(b) by 0 days.

(21) Appl. No.: 10/753,459

(22) Filed: Jan. 9, 2004

(51) Int. Cl.⁷ .............................. A23L 1/00; A47J 31/00; A47J 31/02; A47J 31/18; A47J 43/28
(52) U.S. Cl. ............................ 99/323; 99/279; 99/495
(58) Field of Search ................... 99/495, 494, 484, 99/275, 279, 322, 323, 295, 297, 316–319; 220/23.8, 912, 712, 713, 718; 221/312 C; 222/54; 206/219, 222; 210/474–479, 181, 282; 426/77, 78, 86, 110, 112, 115, 120, 134, 82–84, 6, 432, 433, 435

(56) References Cited

U.S. PATENT DOCUMENTS

| | | | | |
|---|---|---|---|---|
| 786,666 | A | * | 4/1905 | McKenzie ................... 99/319 |
| 2,788,733 | A | * | 4/1957 | Jacques ....................... 99/323 |
| 3,750,559 | A | * | 8/1973 | Wakabayashi ............ 99/323 X |
| 3,854,389 | A | * | 12/1974 | Hillemann ................... 99/295 |
| 5,775,205 | A | * | 7/1998 | Melton ........................ 99/322 |
| 6,283,013 | B1 | * | 9/2001 | Romandy et al. ......... 99/495 X |
| 6,327,965 | B1 | * | 12/2001 | Lin Tien ...................... 99/299 |
| 6,343,542 | B1 | * | 2/2002 | Shen ........................... 99/299 |
| 6,372,270 | B1 | * | 4/2002 | Denny .......................... 426/77 |
| 6,477,942 | B1 | * | 11/2002 | Guu ........................... 9/495 X |
| 6,481,337 | B1 | * | 11/2002 | Guu .......................... 99/495 X |
| 6,494,128 | B1 | * | 12/2002 | Yu ............................ 99/495 X |
| 6,494,129 | B2 | * | 12/2002 | Lin ............................. 99/320 |

* cited by examiner

Primary Examiner—Timothy F. Simone
(74) Attorney, Agent, or Firm—Rosenberg, Klein & Lee

(57) ABSTRACT

A container for making tea includes a body having a receiving space defined therein, and extending therethrough to define a first opening in a top and a second opening in a bottom. A resilient pad is attached to the top of the body for closing the first opening. A seam is centrally defined in the resilient pad for exhausting expanding hot air in the body. A cap is detachably mounted to the top of the body to hold the resilient pad in place. The cap has a through hole centrally defined therein and aligning with the seam in the resilient pad. A filter cup is inversely received in the receiving space corresponding to the second opening for containing tea leaves. A cover is detachably mounted to the bottom of the body for closing the second opening and holding the filter cup in place.

7 Claims, 9 Drawing Sheets

CONTAINER FOR MAKING TEA

BACKGROUND OF THE INVENTION

1. Field of the Invention

The present invention relates to a container, and more particularly to a container for making tea.

2. Description of Related Art

A conventional container for making tea in accordance with the prior art shown in FIGS. 9 and 10 comprises a body (7) having a receiving space (71) longitudinally defined therein. The receiving space (71) extends to a top of the body (7) to define an opening (711). A filter cup (8) is receiving in an upper portion of the receiving space (71) for receiving tea leaves. A cover (9) is detachably mounted to the top of the body (7) for closing the opening (711) in the body (7).

When making tea, some tea leaves (B) is put into the filter cup (8) and the hot water is poured into the receiving space (71) via the filter cup (8) for dipping the tea leaves (B). The tea leaves (B) can fully stretch in the filter cup (8). The tea is finished when the tea leaves fully stretch.

However, the filter cup (8) is received in the upper portion of the receiving space (71) so that the height of the level of the hot water must higher that that of the tea leaves for fully dipping tea leaves (B). As a result, the tea leaves (B) may not be fully dipped in the hot water when the water is drunken in the dip process and the tea in the body (7) is always thin.

In addition, the openings of the filter cup (8) and the body (7) are in the same direction so that the tea leaves may moved into the mouth of the drinker with the tea during drinking. Consequently, the drinker may feel uncomfortable.

The present invention has arisen to mitigate and/or obviate the disadvantages of the conventional container for making tea.

SUMMARY OF THE INVENTION

The main objective of the present invention is to provide an improved container for making tea The container of the present invention can dip tea leaves well and prevent the tea leaves moved into the user's mouth during drinking.

To achieve the objective, the container for making tea in accordance with the present invention comprises a body having a receiving space defined therein, and extending therethrough to define a first opening in a top and a second opening in a bottom. A resilient pad is attached to the top of the body for closing the first opening. A seam is centrally defined in the resilient pad for exhausting expanding hot air in the body. A cap is detachably mounted to the top of the body to hold the resilient pad in place. The cap has a through hole centrally defined therein and aligning with the seam in the resilient pad. A filter cup is inversely received in the receiving space corresponding to the second opening for containing tea leaves. A cover is detachably mounted to the bottom of the body for closing the second opening and holding the filter cup in place.

Further benefits and advantages of the present invention will become apparent after a careful reading of the detailed description with appropriate reference to the accompanying drawings.

DETAILED DESCRIPTION OF THE INVENTION

Figure 1:
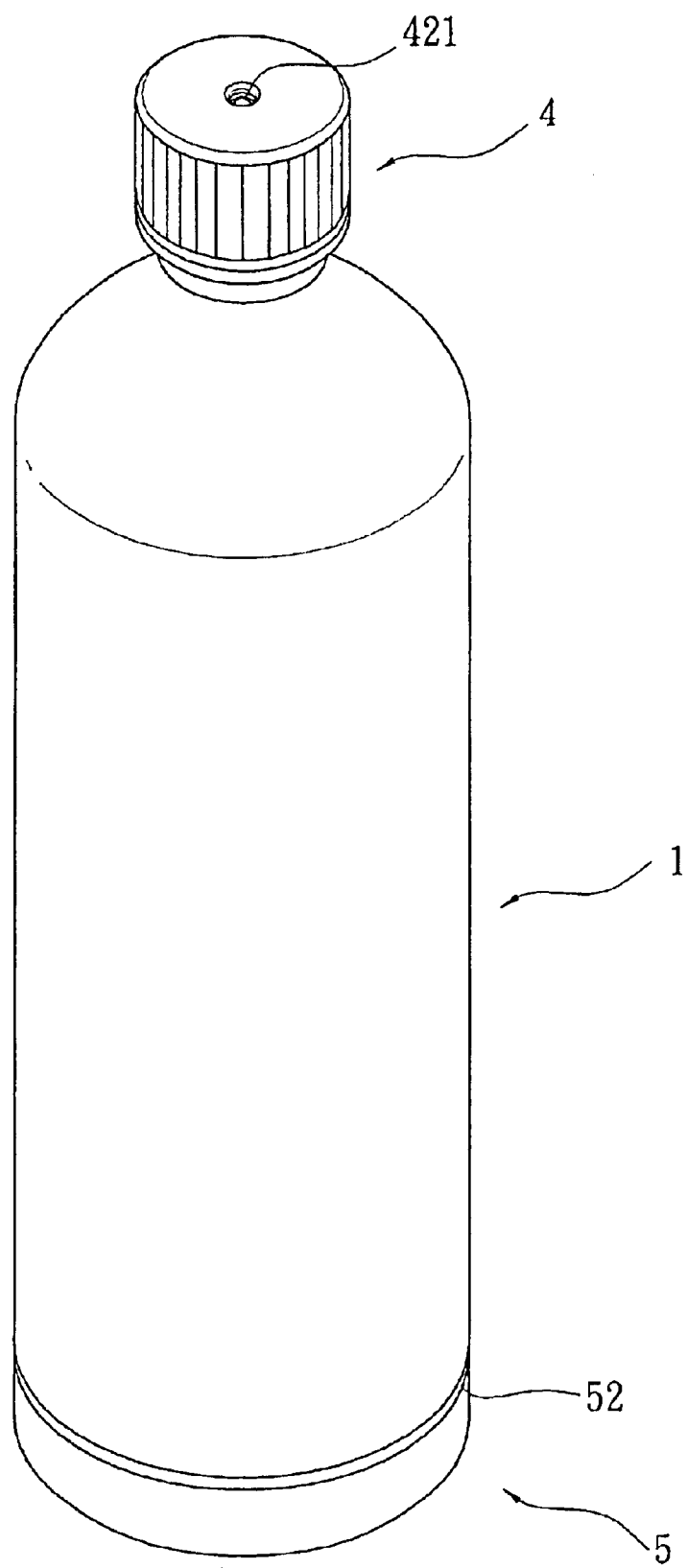
FIG. 1 is a perspective view of a container for making tea in accordance with the present invention.
Figure 2:
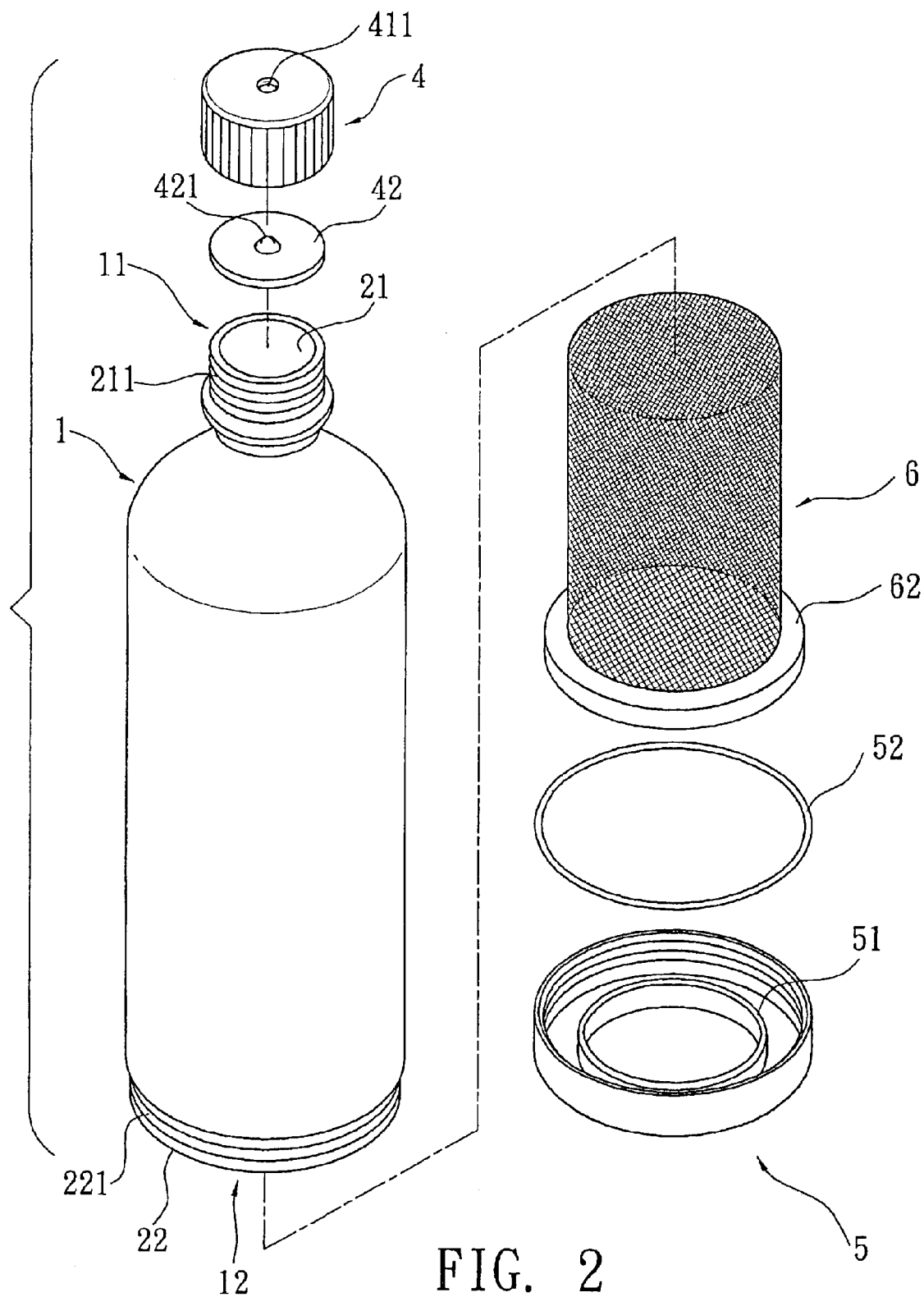
FIG. 2 is an exploded perspective view of the container in FIG. 1.
Figure 3:
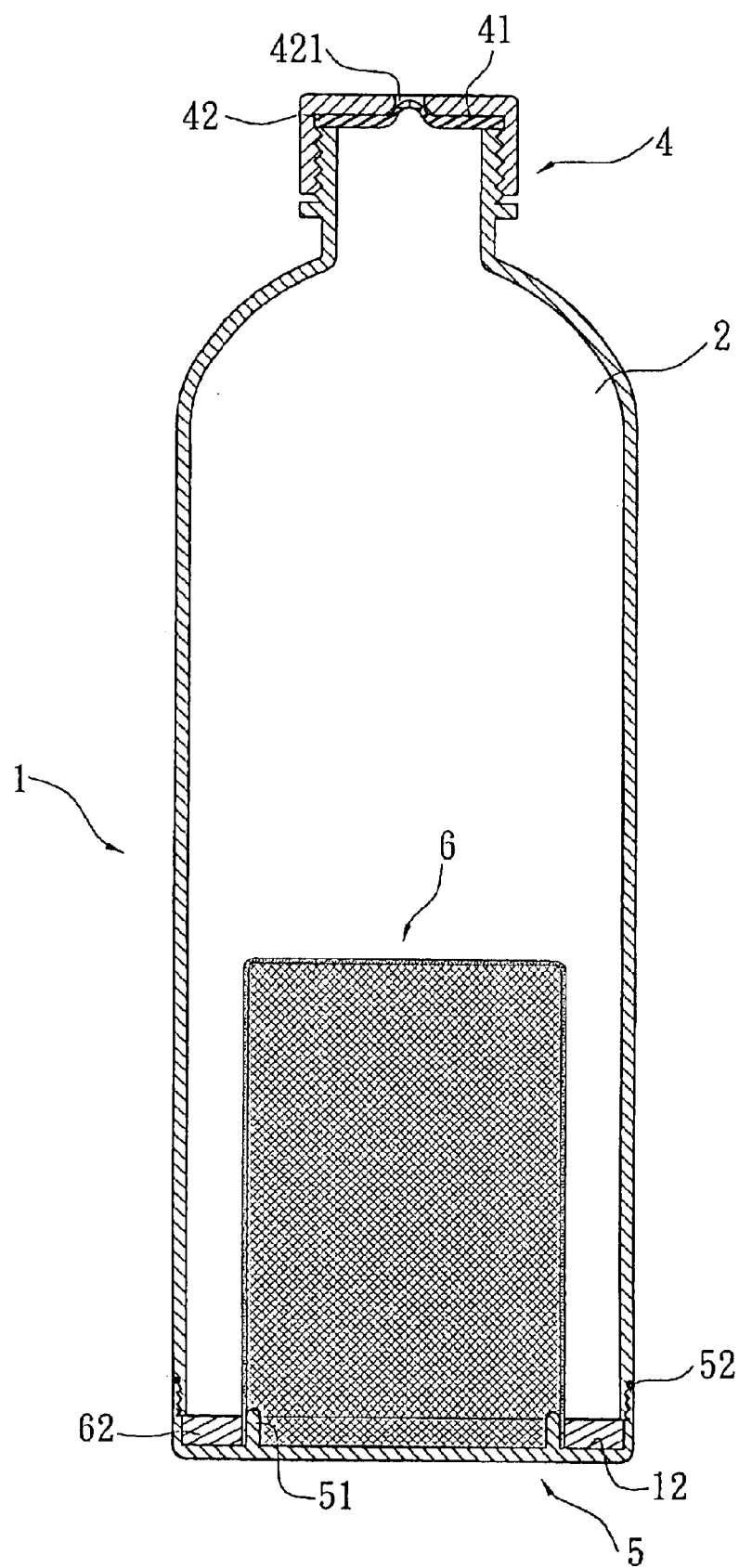
FIG. 3 is a cross-sectional view of the container in FIG. 1.
Figures 4, 5:
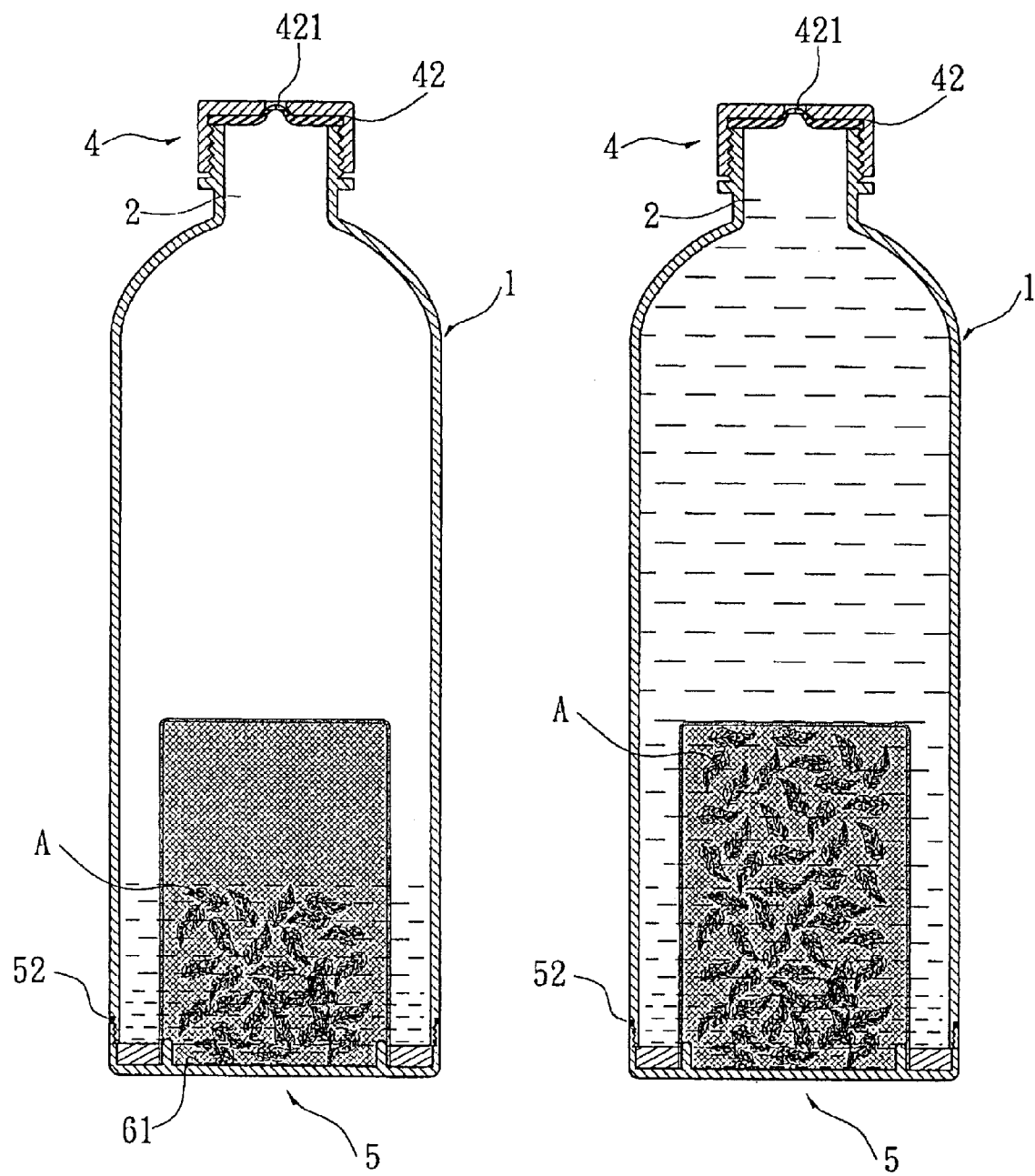
FIG. 4 is an operational view of the container in FIG. 1 when the level of the hot water is in a low condition.
FIG. 5 is an operational view of the container in FIG. 1 when the level of the hot water is in a high condition.

Referring to the drawings and initially to FIGS. 1–6, a container for making tea in accordance with the present invention comprises a body (1) having a receiving space (2) longitudinally defined therein and extending therethrough to define a first opening (21) in a top (11) of the body (1) and a second opening (22) in a bottom (12) of the body (1). The first opening (21) has a diameter smaller than that of the receiving space (2). The body (1) has a first threaded section (211) and a second threaded section (221) form on an outer periphery of the body (1). The first threaded section (211) and the second threaded section (221) respectively correspond to the first opening (21) and the second opening (22). A resilient pad (42) is attached to the top (11) of the body (1) for closing the first opening (21). In the preferred embodiment of the present invention, the resilient pad (42) is made of silica gel. A seam (421) is centrally defined in the resilient pad (42). A cap (4) is mounted to the top (11) of the body (1) for holding the resilient pad (42) in place. The cap (4) includes a threaded inner periphery so that the cap (4) is screwed onto the first threaded section (211) of the body (1). A through hole (411) is centrally longitudinally defined in the cap (411) and corresponds to the seam (421) in the resilient pad (42).

A filter cup (6) is received in a lower portion of the receiving space (2) for containing tea leaves (62) and has an opening (61) defined to correspond the second opening (22) in the bottom (12) of the body (1). An annular protrusion (62) outwardly extends from the filter cup (6) and abuts the bottom (12) of the body (4). The annular protrusion (62) has a diameter smaller than that of the bottom (12) of the body (1). A cover (5) is mounted to the bottom (12) of the body (1) to hold the filter cup (6) in place and close the second opening (22) of the body (1). The cover (5) has a threaded inner periphery so that the cover (5) is screwed onto the bottom (12) of the body (1). A skirt (51) longitudinally extends from the cover (5) and is inserted into the filter cup (6) to prevent the filter cup (6) from being moved during mounting the cover (5). A leakproof element (52) is mounted between the cover (5) and the body (1) to provide an airtight condition between the body (1) and the cover (5). In the preferred embodiment of the present invention, the leakproof element (52) is an O-ring and mounted around the bottom (12) of the cover (5).

When making tea, the body (1) is reversed for adding tea leaves (A) into the filter cup (6) and hot water into the receiving space (2) in the body (1). The body (1) is turned to the original condition after mounting the cover (5). Consequently, the filter cup (6) with the tea leaves (A) is located in the bottom of the body (1) so that the level of the hot water in the receiving space (2) is always higher than a height of the tea leaves (A). As a result, the tea leaves (A) are dipped well during making tea.

The resilient pad (42) and the leakproof element (52) can provide an airtight effect among the cap (4), the body (1) and the cover (5) so that the hot water in the receiving space (2) should not leak from the body when the body (1) is shocked.

In the preferred embodiment of the present invention, the cover (5) has a diameter equal to that of the body (1) for providing an integral appearance. The first opening (21) has a diameter designed corresponding to the size of human's mouth for user to conveniently drink tea in the body (1) and the filter cup (6) is received in the lower portion of the receiving space (2) so that that the tea leaves would not flow into the drinker's mouth.

Figure 6:
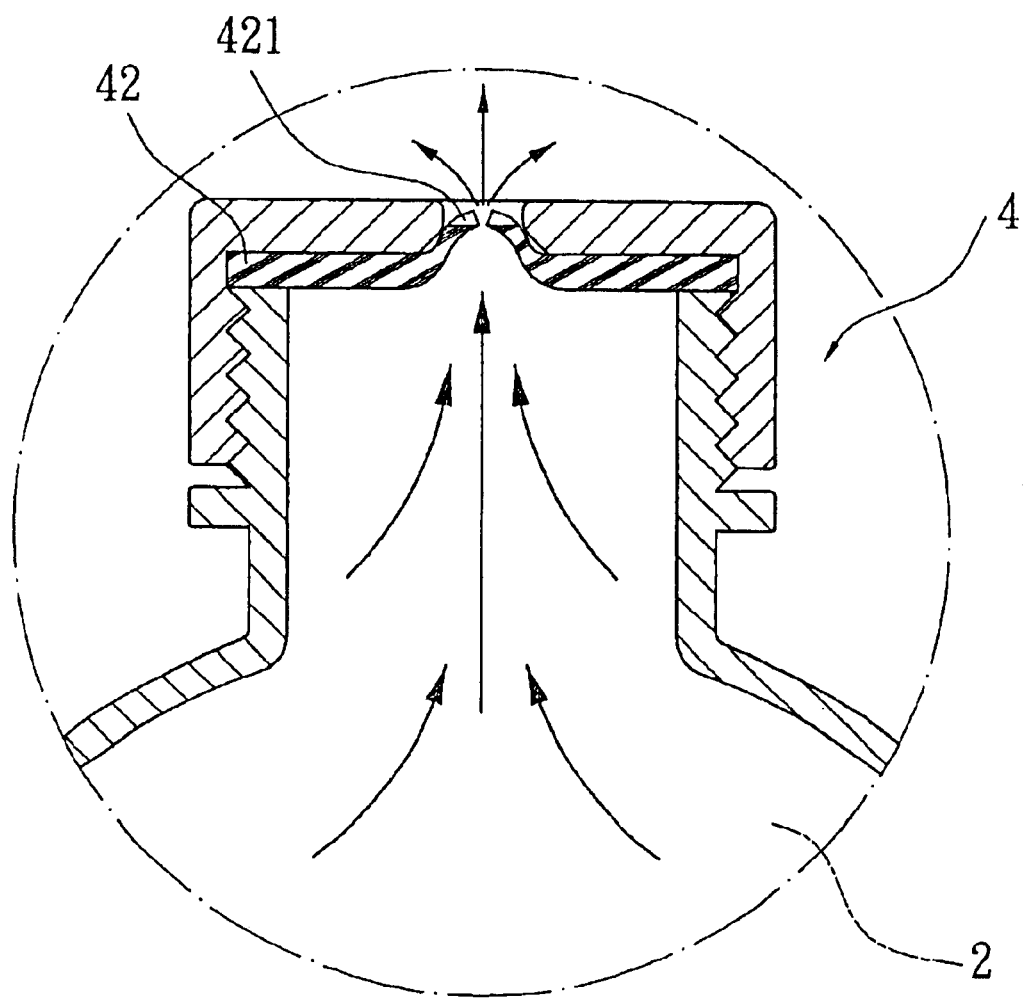
FIG. 6 is a partially enlarged view of the first cover of the present invention when exhausting vapor.

With reference to FIG. 6, the air in remained space in the receiving space (2) will expand due to the temperature of the hot water in the body (1). The expanding air in the body (1) will exhaust from the seam (421) in the resilient pad (42) to balance the pressures in the body (1) and atmospheric pressure. Consequently, user can easily detach the cap (4) and the cover (5) when the hot-water in the body (1) is cooling down.

Figure 7:
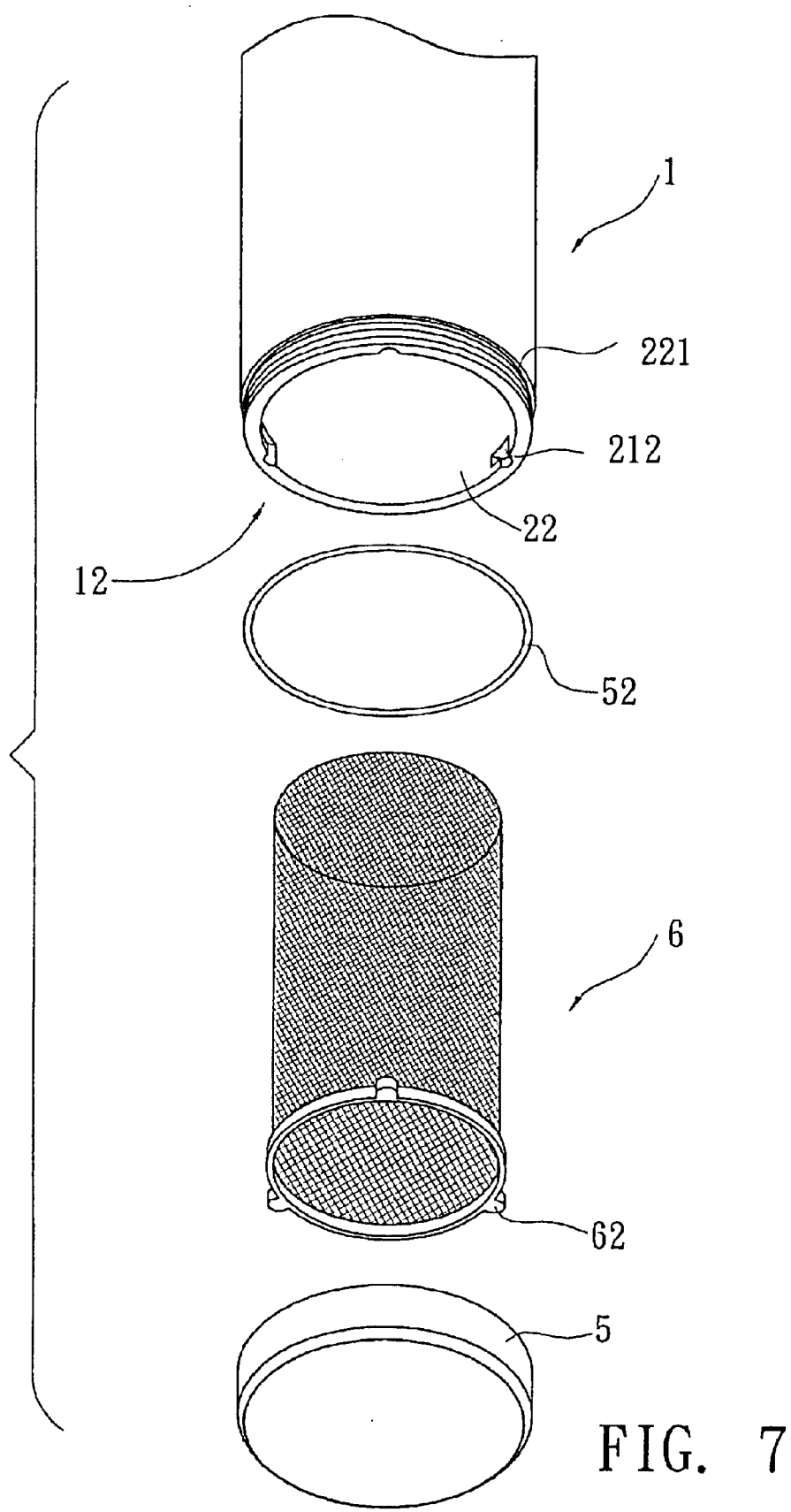
FIG. 7 is a partially exploded perspective view of a second embodiment of the container for making tea in accordance with the present invention.
Figure 8:
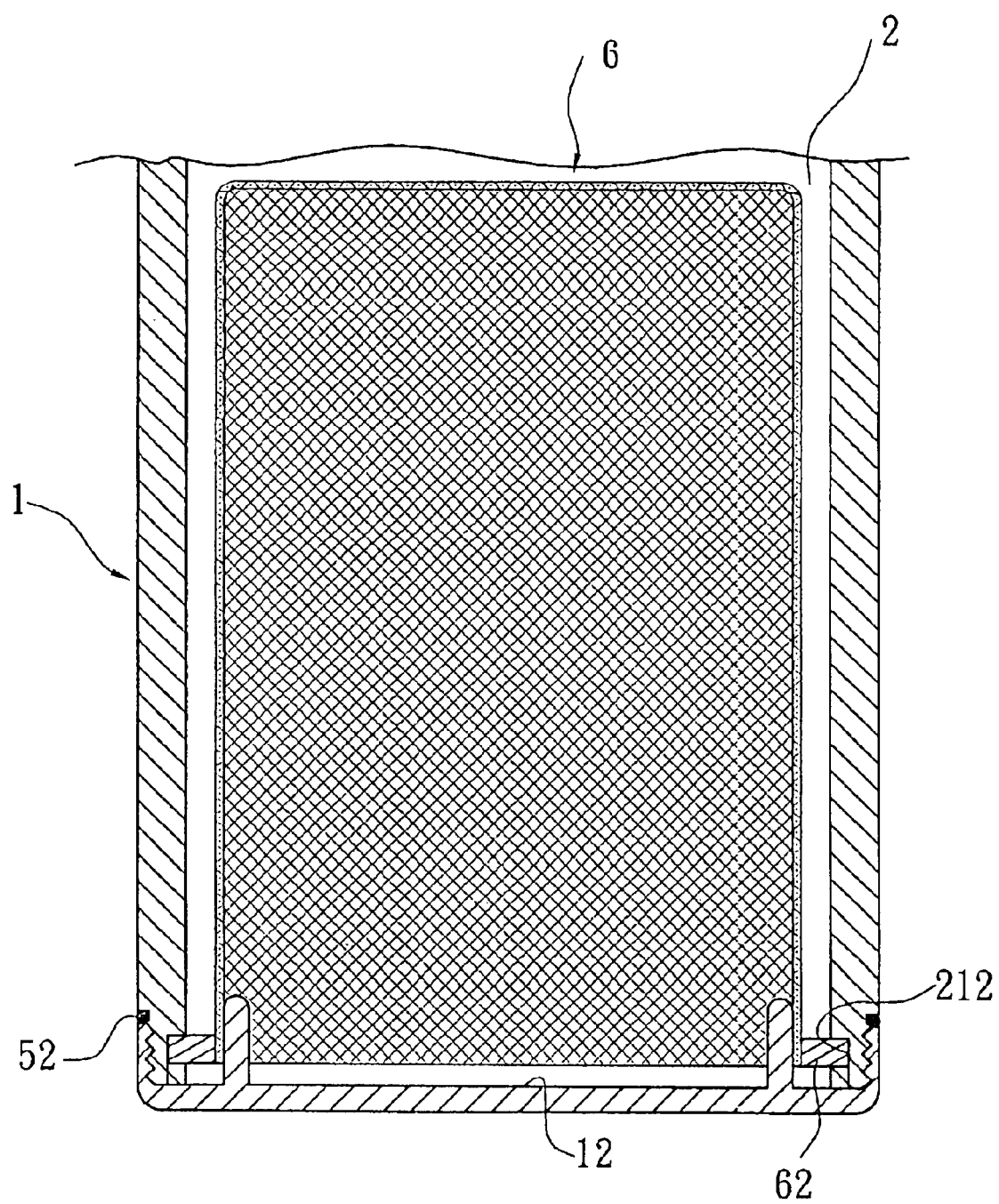
FIG. 8 is a partially cross-sectional view of the container in FIG. 7 after being assembled.
Figure 9:
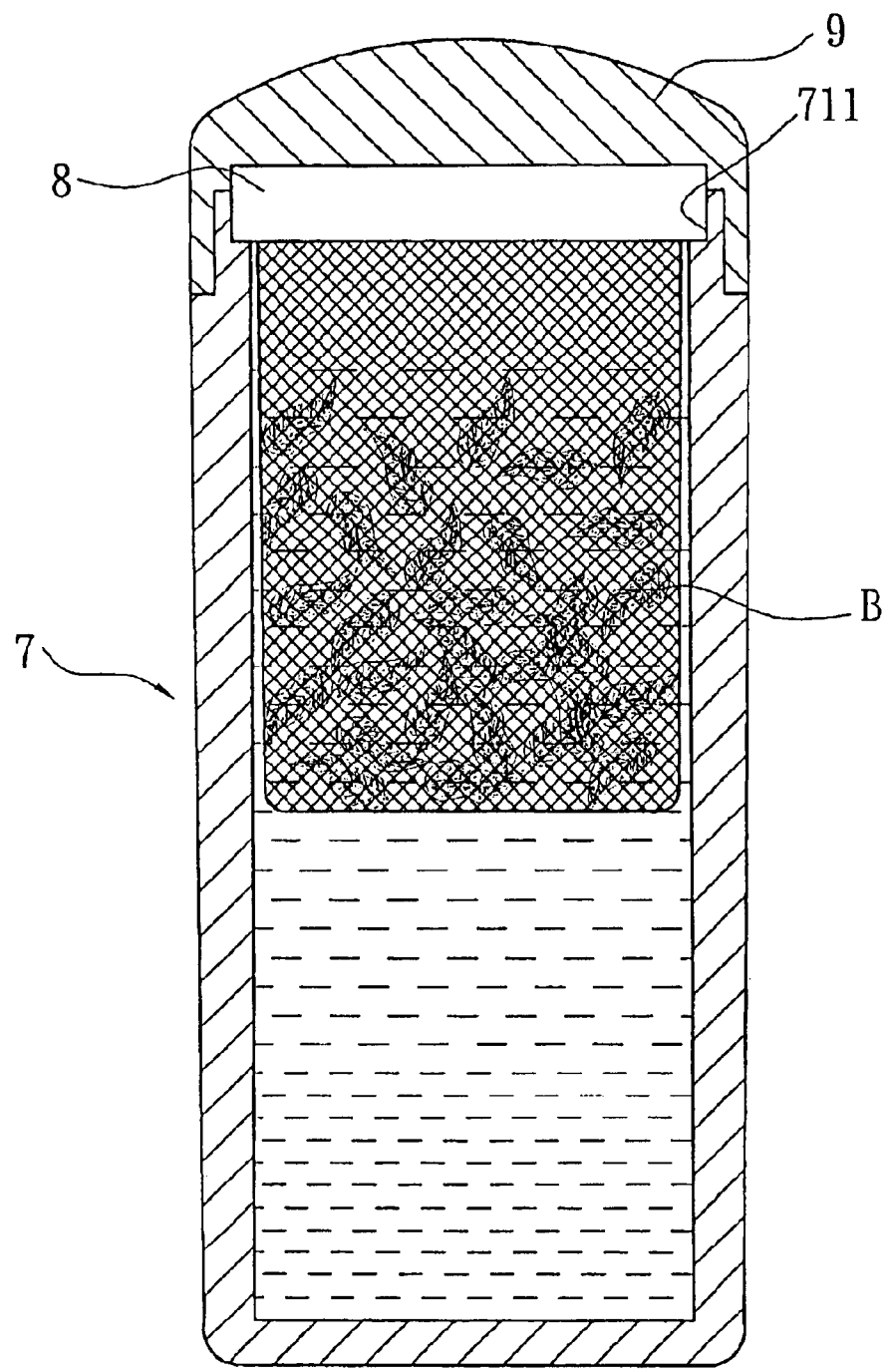
FIG. 9 is a cross-sectional view of a conventional container for making tea in accordance with the prior art when the level of the hot water is in a high condition.
Figure 10:
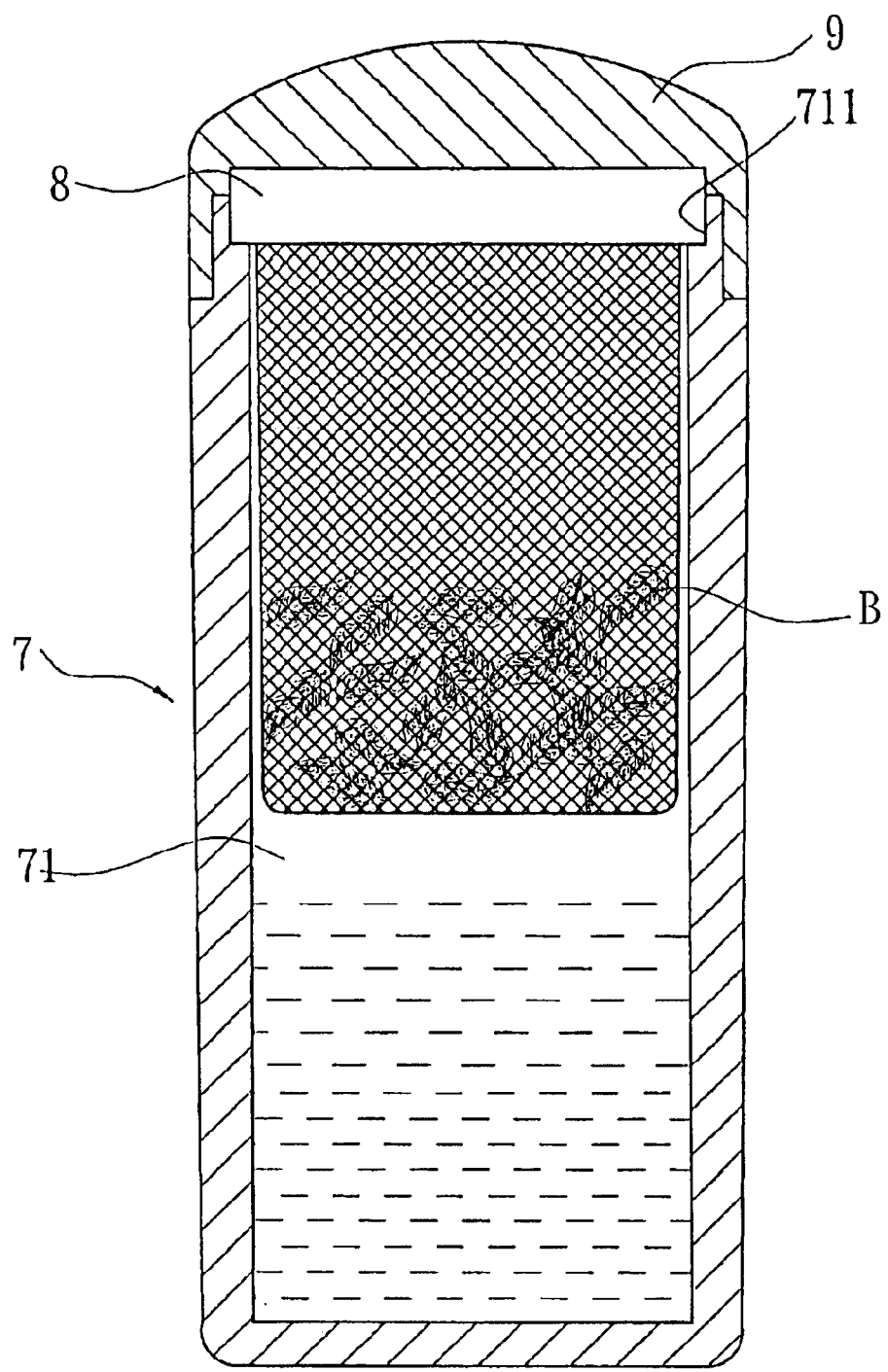
FIG. 10 is cross-sectional view of the container in FIG. 9 when the level of the hot water is in a low condition.

With reference to FIGS. 7 and 8 that show a second embodiment of a container for making tea in accordance with the present invention, the body (1) has at least two reversed-L-shaped slots (212) defined in an inner periphery of the bottom of the body (1). In the preferred embodiment of the present invention, the body (1) has three reversed-L-shaped slots (212) defined therein. The filter cup (6) has at least two stubs (62) outwardly extending therefrom corresponding to the opening of the filter cup (6). Each stub (62) is moved within a corresponding one of the at least two reversed-L-shaped slots (212) to prevent the filter cup (6) from suddenly detaching from the body (1).

Although the invention has been explained in relation to its preferred embodiment, it is to be understood that many other possible modifications and variations can be made without departing from the spirit and scope of the invention as hereinafter claimed.

What is claimed is:

1. A container for making tea, comprising:
    a body having a receiving space longitudinally defined therein, and extending therethrough to define a first opening in a top of the body and a second opening in a bottom of the body, wherein the first opening has a diameter smaller than that of the second opening;
    a resilient pad attached to the top of the body for closing the first opening, a seam centrally defined in the resilient pad for allowing expanding hot air in the body exhausting from the body;
    a cap detachably mounted to the top of the body to hold the resilient pad in place, the cap having a through hole centrally defined therein and aligning with the seam in the resilient pad;
    a filter cup inversely received in the receiving space corresponding to the second opening for containing tea leaves and prevent the tea leaves from flowing into the drinker's mouth, the filter cup having a opening corresponding to the second opening in the body; and
    a cover detachably mounted to the bottom of the body for closing the second opening and holding the filter cup in place.

2. The container as claimed in claim 1, wherein the cover has a diameter equal to that of the body for providing a complete appearance.

3. The container as claimed in claim 1, wherein body comprises a first threaded section and a second threaded section respectively formed on an outer periphery of the body, the first threaded section and the second threaded section respectively corresponding to the first opening and the second opening, each of the cap and the cover having a threaded inner periphery so that the cap and the cover are respectively screwed onto the first threaded section and the second threaded section of the body.

4. The container as claimed in claim 3 further comprising a leakproof element mounted around the second threaded section between the cover and the body for providing an airtightly condition between the cover and the body.

5. The container as claimed in claim 1, wherein the filter cup comprises an annular protrusion outwardly extending therefrom and corresponding to the opening of the filter cup, the annular protrusion having a diameter smaller than that of the bottom of the body and abutting the bottom of the body so that the filter is positioned when the cover is mounted to the bottom of the body.

6. The container as claimed in claim 1, wherein the cover comprises a skirt longitudinally extending from the cover and inserted into the filter cup to prevent the filter cup from being moved during mounting the cover.

7. The container as claimed in claim 1, wherein the body comprises at least two reversed-L-shaped slots defined in an inner periphery of the bottom of the body and the filter cup comprises at least two stubs outwardly extending therefrom corresponding to the opening of the filter cup, each stub moved within a corresponding one of the at least two reversed-L-shaped slots to prevent the filter cup from suddenly detaching from the body.

* * * * *